(12) United States Patent
Butters (10) Patent No.: US 11,363,333 B2
(45) Date of Patent: Jun. 14, 2022

(54) SYSTEM AND METHOD OF MEASURING DELAY BETWEEN TRANSMITTED AUDIO AND VIDEO SIGNALS

(71) Applicant: GRASS VALLEY LIMITED, Newbury (GB)

(72) Inventor: Jeffery R. Butters, Newbury (GB)

(73) Assignee: GRASS VALLEY LIMITED, Newbury (GB)

( * ) Notice: Subject to any disclaimer, the term of this patent is extended or adjusted under 35 U.S.C. 154(b) by 0 days.

(21) Appl. No.: 16/943,571

(22) Filed: Jul. 30, 2020

(65) Prior Publication Data
US 2021/0044867 A1 Feb. 11, 2021

Related U.S. Application Data

(60) Provisional application No. 62/883,022, filed on Aug. 5, 2019.

(51) Int. Cl.
*H04H 60/33* (2008.01)
*H04N 21/442* (2011.01)
(Continued)

(52) U.S. Cl.
CPC ....... *H04N 21/44209* (2013.01); *G01S 19/14* (2013.01); *G01S 19/23* (2013.01);
(Continued)

(58) Field of Classification Search
CPC ........... H04N 21/44209; H04N 21/233; H04N 21/234; H04N 21/235; H04N 21/236;
(Continued)

(56) References Cited

U.S. PATENT DOCUMENTS

2006/0133251 A1 6/2006 Thangaraj et al.
2008/0304571 A1* 12/2008 Tsukagoshi ........ H04N 21/2368
375/240.25
(Continued)

FOREIGN PATENT DOCUMENTS

EP 1786209 A1 5/2007
EP 3160148 A1 4/2017

OTHER PUBLICATIONS

International Search Report and Written Opinion for PCT/GB2020/051866, dated Oct. 23, 2020, 18 pages.

*Primary Examiner* — Mulugeta Mengesha
(74) *Attorney, Agent, or Firm* — ArentFox Schiff LLP (57) ABSTRACT

A system is provided for measuring delay between audio and video signals. The system includes a transmission device for embedding a video timestamp to a video signal based on at least one remote timestamp generated by a first time server; and for embedding an audio timestamp to an audio signal based on the at least one remote timestamp generated by a first time server. Moreover, a delay processor determines an absolute delay and a relative delay between the audio and video signals by comparing each of the extracted video timestamp and the extracted audio timestamp with a local timestamp generated by the second time server. A synchronization signal is generated based on the measured absolute and relative delays; and used to synchronize the audio signal with the video signal to generate a media playout signal.

22 Claims, 4 Drawing Sheets

(51) Int. Cl.
  *G01S 19/14*      (2010.01)
  *G01S 19/23*      (2010.01)
  *H04N 21/233*     (2011.01)
  *H04N 21/234*     (2011.01)
  *H04N 21/235*     (2011.01)
  *H04N 21/236*     (2011.01)
  *H04N 21/2389*    (2011.01)
  *H04N 21/43*      (2011.01)

(52) U.S. Cl.
  CPC ......... *H04N 21/233* (2013.01); *H04N 21/234* (2013.01); *H04N 21/235* (2013.01); *H04N 21/236* (2013.01); *H04N 21/23892* (2013.01); *H04N 21/4305* (2013.01)

(58) Field of Classification Search
  CPC .......... H04N 21/23892; H04N 21/4305; G01S 19/14; G01S 19/23
  See application file for complete search history.

(56) References Cited

U.S. PATENT DOCUMENTS

| | | | |
|---|---|---|---|
| 2009/0091655 A1* | 4/2009 | Russell | H04N 21/2368 348/515 |
| 2012/0063603 A1* | 3/2012 | Evans | H04N 21/6156 381/17 |
| 2018/0359508 A1* | 12/2018 | Lindgren | H04N 21/4307 |

* cited by examiner

SYSTEM AND METHOD OF MEASURING DELAY BETWEEN TRANSMITTED AUDIO AND VIDEO SIGNALS

CROSS REFERENCE TO RELATED APPLICATIONS

The present application claims priority to U.S. Provisional Application No. 62/883,022, filed Aug. 5, 2019, the entire contents of which are hereby incorporated by reference.

TECHNICAL FIELD

The present disclosure generally relates to video processing, and, more particularly, to systems and methods of measuring delay between transmitted audio and video signals.

BACKGROUND

In the transmission of digital broadcast information, audio and video signals may experience various delays along the transmission path, though the delay may not be experienced to the same degree across the audio and the video. As a result, while the audio and video may originally be synchronized, by the time the signals have been delivered, the audio and video signal may be significantly out of sync. This may introduce significant lip-sync errors and other errors that detract from the quality of a digital video and audio stream. Some commercial products have been introduced to measure delay between the audio and video feeds, and generally give good measurement results. However, these solutions tend to be incredibly complex and therefore are not lightweight solutions that can be added to different products without the need for dedicated audio/video (A/V) line-up (i.e., synchronization) equipment.

Therefore, there is a need for lightweight, simple patterns for A/V delay measurement and signal synchronization.

SUMMARY

Thus, according to an exemplary aspect, systems and methods are disclosed that are configured to measuring delay between transmitted audio and video signals.

In general, the system comprises a first time server configured to generate a first timestamp, wherein the first time server references a GNSS signal, a transmission device configured to apply a first timestamp to a video signal and a second timestamp to an audio signal, a receiver configured to receive the audio and video signal, a second time server local to the receiver, configured to synchronize a clock of the receiver to periodically generate a local timestamp, wherein the time server also references the GNSS signal. Moreover, a delay processor is provided and configured to extract the first timestamp from the video signal and the second timestamp from the audio signal and compare the first timestamp and the second timestamp to the local timestamp to measure absolute delay and relative delay between the audio signal and the video signal.

In another exemplary aspect, a system is provided for measuring delay between audio and video signals. In this aspect, the system includes a first time server configured to generate at least one remote timestamp, wherein the first time server references a global navigation satellite system ("GNSS") signal; a transmission device configured to embed a video timestamp to a video signal based on the generated at least one remote timestamp and to embed an audio timestamp to an audio signal based on the generated at least one remote timestamp; a receiver configured to receive the audio and video signal with the respective embedded video and audio timestamps; a second time server local to the receiver, and configured to synchronize a clock of the receiver to periodically generate a local timestamp, wherein the second time server is configured to synchronize the clock of the receiver based on the GNSS signal; and a delay processor configured to extract the embedded video timestamp from the video signal and the embedded audio timestamp from the audio signal to determine an absolute delay and a relative delay between the audio and video signals by comparing the local timestamp with each of the extracted video timestamp and the extracted audio timestamp. Moreover, the absolute delay measures each of the extracted video and audio timestamps to the local timestamp; and the relative delay measures the extracted video timestamp to the extracted audio timestamp. In an aspect, the delay processor is further configured to generate a synchronization signal based on the measured absolute and relative delays; and the synchronization signal is configured to synchronize the audio signal with the video signal to generate a media playout signal that comprises the audio and video signals and is configured for playout on a content consuming device.

In another exemplary aspect, the receiver is at least one of a video router, a video switcher, a standards converter and a multi-viewer.

In another exemplary aspect, the delay processor is further configured to transmit a signal to the transmission device to terminate embedding of at least one of the video timestamp in the video signal and the audio timestamp in the audio signal when a delay of at least one of the audio and video signals is above a predetermined time threshold.

In another exemplary aspect, the transmission device is further configured to embed the video timestamp into the active picture of the video signal that indicates a time of an alignment point immediately preceding a start of the active picture; and embed the audio timestamp to an audio channel of the audio signal that indicates a reference time within a data pattern of the audio timestamp that is unlinked to the video signal.

In another exemplary aspect, the video timestamp is equivalent to the audio timestamp.

In another exemplary aspect, the transmission device comprises a conversion processor configured to convert the video signal with the embedded video timestamp and the audio signal with the embedded audio timestamp to respective IP packetized data signals to be transmitted to the receiver.

In another exemplary aspect, the first time server is locked directly by to the GNSS signal to generate the at least one remote timestamp and the second time server is locked directly by to the GNSS signal to synchronize the clock of the receiver.

In yet another exemplary aspect, a system is provided for measuring delay between audio and video signals. In this aspect, the system includes a transmission device configured to embed a video timestamp to a video signal based on at least one remote timestamp generated by a first time server; and embed an audio timestamp to an audio signal based on the at least one remote timestamp generated by the first time server. Moreover, the system includes a receiver configured to receive the audio and video signal with the respective embedded video and audio timestamps; and a delay processor configured to extract the embedded video timestamp from the video signal and the embedded audio timestamp from the audio signal to determine an absolute delay and a relative delay between the audio and video signals by comparing each of the extracted video timestamp and the extracted audio timestamp with a local timestamp generated by a second time server that is local to the receiver. Moreover, the delay processor is further configured to generate a synchronization signal based on the measured absolute and relative delays; and the synchronization signal is configured to synchronize the audio signal with the video signal to generate a media playout signal that comprises the audio and video signals and is configured for playout on a content consuming device.

In yet another exemplary aspect, a system is provided for measuring delay between audio and video signals. In this aspect, the system includes means for embedding a video timestamp to a video signal based on at least one remote timestamp generated by a first time server; means for embedding an audio timestamp to an audio signal based on the at least one remote timestamp generated by the first time server; means for extracting the embedded video timestamp from the video signal and the embedded audio timestamp from the audio signal to determine an absolute delay and a relative delay between the audio and video signals by comparing each of the extracted video timestamp and the extracted audio timestamp with a local timestamp generated by a second time server local; means for generating a synchronization signal based on the measured absolute and relative delays; and means for synchronizing the audio signal with the video signal to generate a media playout signal that comprises the audio and video signals and is configured for playout on a content consuming device.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

DETAILED DESCRIPTION

Various aspects of the disclosure are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the disclosure in order to provide a basic understanding thereof.

Figure 1:
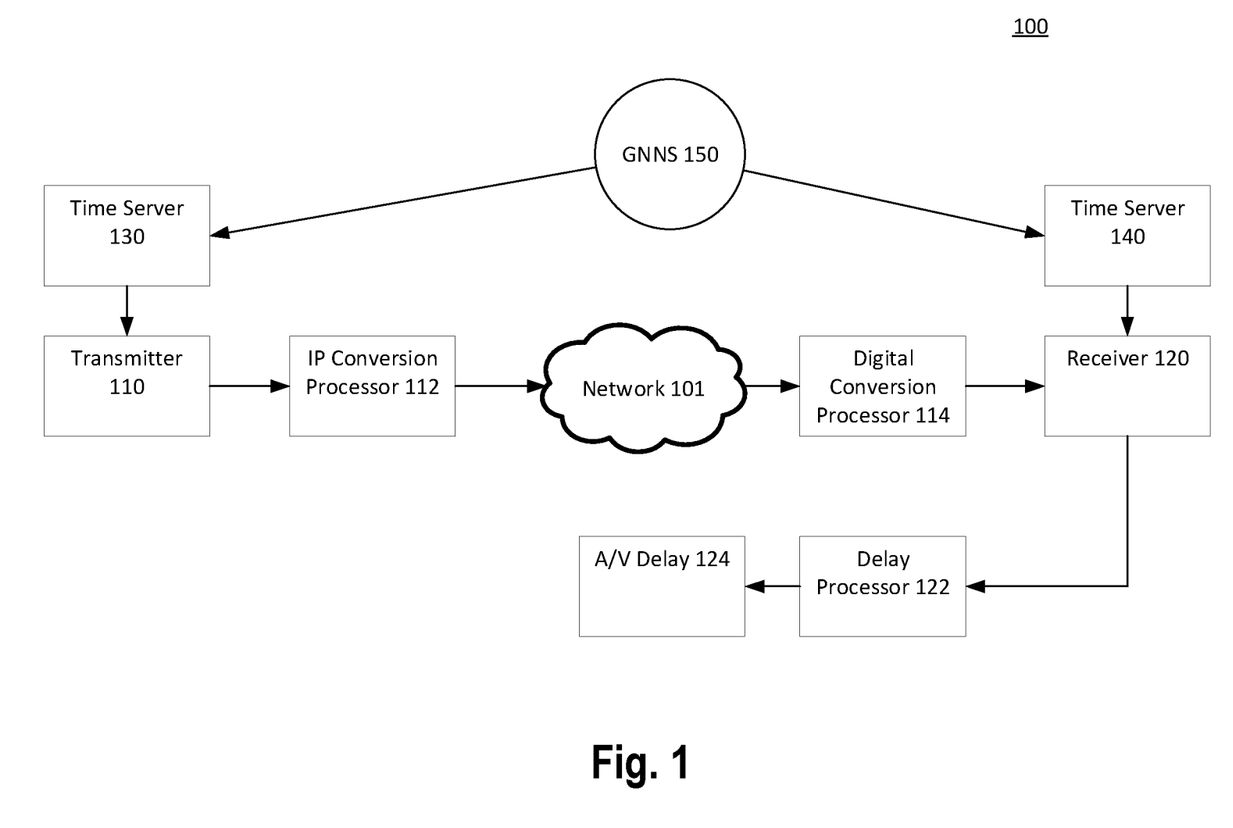
FIG. 1 is a block diagram of a system for measuring delay between transmitted audio and video signals, in accordance with an exemplary aspect of the present disclosure.

FIG. 1 is a block diagram of a system 100 of measuring delay between transmitted audio and video signals, in accordance with exemplary aspects of the present disclosure.

The system 100 is generally shown to include a network 101, transmitter 110, an IP conversion processor 112, a digital conversion processor 114, a receiver 120, a delay processor 122, a first time server 130, a second time server 140 and a global navigation satellite system (GNSS) (e.g., a GPS server 150 or the like).

It is noted that network 101 can be any network for communicating media content and data and can include a communication system (not shown) that connects the various components of the system 100 by wire, cable, fibre optic, and/or wireless links facilitated by various types of well-known network elements, such as hubs, switches, routers, and the like. In addition, it should be appreciated that the network may employ various well-known protocols to communicate information amongst the network resources. In one aspect, the network can be part of the Internet or intranet using various communications infrastructure such as Ethernet, Wi-Fi and the like.

Moreover, the system 100 is configured to measure delay between audio and video signals transmitted between the transmitter 110 and the receiver 120. In exemplary aspects, the transmitter 110 may comprise a video camera, a video server or other video transmission components, though the present disclosure is not limited thereto. In exemplary aspects, the receiver 120 may be frame synchronizer, a video router, a video switcher, a standards converter or a multiviewer, though the present disclosure is also not limited thereto. Furthermore, the system 100 is configured to perform, in some aspects, a lineup measurement taken instantaneously to determine that delays are as expected at the receiver 120. When the delays are as expected, for example, if the delay of one of the signals is above a predetermined time threshold, the delay processor 122 may send a signal to the transmitter 110 to terminate generation of the timestamp and assume the delay remains constant when used for a live signal. In other aspects the timestamp generation may continue depending on system configuration.

The transmitter 110 is configured to transmit an audio and video stream over the network 101 to a receiver 120. Prior to transmission over the network 101, in one aspect the transmitter 110 obtains a local timestamp from time server 130. In exemplary aspects, the time server 130 is located locally with the transmitter 110 in order to receive an accurate and precise local time. In general, it should be appreciated that increasing the number of switches or equipment between the transmitter 110 and the time server 130 will likely increase the inaccuracy of the timestamp generated for comparison. In one aspect, the time server 130 is on the same local area network as the transmitter 110. In some aspects, the transmitter 110 is configured to transmit the audio and video signal within the serial digital interface (SDI) domain where delay may be introduced or altered through additional A/V processing instead of an IP network.

The precision timestamp may be, in one aspect, a precision time protocol (PTP) timestamp, NTP or the like. In video over IP, for example, data packets have 32 bit numbers representing a 90 KHz media clock where numbers repeat after approximately 13 hours. SMPTE ST 2059-1 has a method for synchronizing the data packets to precision time.

Figure 2:
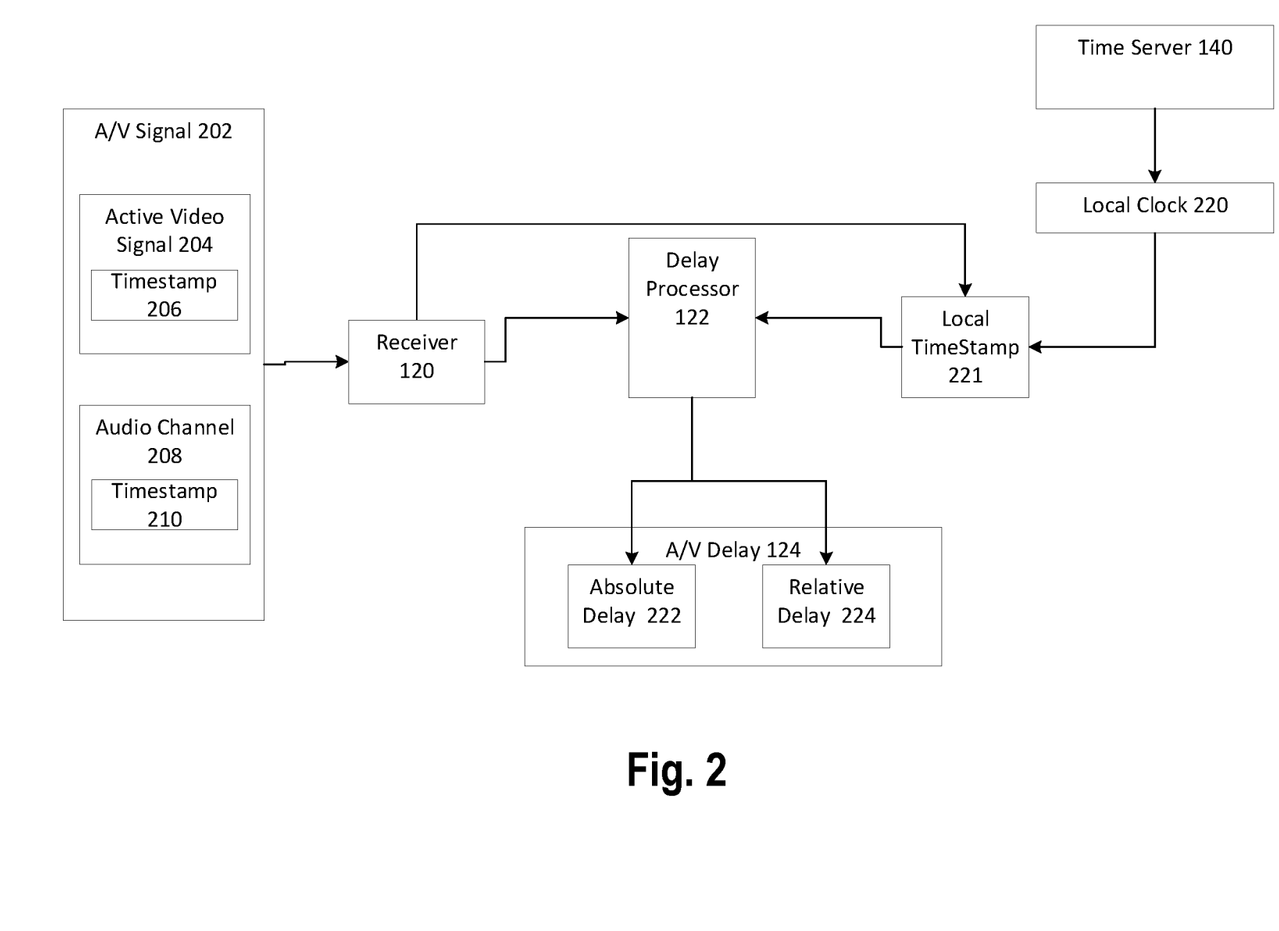
FIG. 2 is a block diagram of showing further detail of the system according to an exemplary aspect of the disclosure.

As shown in FIG. 2, the transmitter 110 or a module associated with the transmitter 110 is configured to embed the timestamp 206 into the active picture of the video signal 204 that indicates the time of the alignment point immediately preceding the start of picture. The timestamp 206 may be similar to vertical interval timecode (VITC) or teletext in that it may be a series of high and low luma levels representing the bits of a precision timecode (e.g., 64 bits or up to 80 bits for PTP), in one or more lines at a particular region in the picture (e.g., the top of the picture according to some standards). For format conversion to smaller pictures, more lines may be needed. For example, if a 1080 line frame is converted to a 288 line standard definition field then (1080/288=3.74) more than 4 lines of test pattern are desired on the starting picture in order to have a reasonable chance of reading the pattern on the down-converted picture. More lines may be needed depending on how many input lines make a contribution to an output line. In some aspects, the timestamp received at the transmitter is generated from a local clock synchronized to the time server, rather than directly from the time server.

SDI video may carry several audio channels embedded in the blanking: SD and HD can have up to 16 channels, 3G up to 32 channels and UHD up to 128 channels. In some aspects, each channel may carry the test signal (i.e., the timestamps) or an otherwise unused channel could be representative of the timing of other channels not carrying the test pattern. Moreover, a timestamp 210 may be embedded into one of the audio channels, for example, the audio channel 208, indicating a reference time within the timestamp data pattern (e.g., the start of the audio timestamp or the like), unlinked to the video signal, with a particular frequency or provided in a single packet. In one aspect, the audio timestamp may be similar to a linear time code (LTC) timestamp.

According to one aspect, the timestamp 210 may be DC balanced using a balanced code such as 8b/10b with a sync edge for time reference, though others may also be used in order to prevent reduced accuracy when DC bias may be removed from the signal. In exemplary aspects, the timestamp 206 and the timestamp 210 may be equivalent, though the present disclosure is not limited thereto. In exemplary aspects, the timestamp 210 is transmitted as a waveform, instead of sample values and therefore is essentially unaltered by rate conversion (when the samples are passed through a temporal filter that may modify the waveform). Furthermore, the frequency of generating a timestamp on the audio channel 208 may be the same as the frequency of generating a timestamp on the video signal 204, though in other aspects this may differ. In exemplary aspects, the audio timestamp is generated twenty, ten or one time per second.

Once the audio and the video components of the A/V signal 202 are both embedded with timestamps, the IP conversion processor 112 converts the A/V signal 202 (which in some aspects may be an SDI signal) to IP packetized data where the signal may be transmitted over the network 101. If the SDI signal is converted to internet protocol (IP), such as IP data packets for example as shown in FIG. 1, according to SMPTE ST 2110-20, the horizontal and vertical blanking are not included in the encoded video signal, only the active part is included. At the receiving end, a digital conversion processor 114 converts the packetized signal to an SDI signal with the original A/V signal 202, including the timestamps 206 and 210. In exemplary aspects, the signal may stay within the SDI range, transmitted without an IP network, transmitted over a co-axial cable, an optical fiber, an SDI router, or any piece of processing equipment that separates the audio and the video, then performs recombination.

The receiver 120 is coupled to the time server 140. In exemplary aspects, the time server 140 is located locally with the receiver 120 in order to receive an accurate and precise local time. Increasing the number of switches or equipment between the receiver 120 and the time server 140 increases the inaccuracy of the timestamp generated for comparison. In exemplary aspects therefore, the time server 140 is located on the same local area network as the receiver 120. A local clock 220 receives periodic updates (e.g., time referenced signals) from the time server 140, independent of audio and video signals. It is noted that the local clock 220 can be a component generated by the receiver 120, the time server 140, or a standalone component. In any event, when the alignment point occurs on the received A/V signal 202, local timestamp 221 is captured from the local clock 220 based on the periodic updates. In exemplary aspects, the time server 130 and 140 are a part of broadcast infrastructure to which the transmitter 110 and the receiver 120 are coupled. The time server 140 and the time server 130 are both locked to the GNSS 150, though in some aspects the time servers may be locked to another time server. Generally, it may be easier to lock a time server to another time server rather than locking the time server to GNSS. In these aspects, a local area network might have one or two time servers locked directly to GNSS receivers but several time servers locked to a local clock to maintain high accuracy on many network segments.

The delay processor 122 has a clock synchronized to the local time via, in some aspects, an internal clock rather than network connected clock so that the comparison timestamps do not come directly from the time server. The delay processor compares the extracted timestamp 210 of the audio channel 208 with the local clock 220 at the reference times on the audio and video signals, such as the alignment point in the video, or the reference time in the audio test pattern mentioned above, as shown in FIG. 2. The delay processor 122 also compares the extracted timestamp 206 of the video signal 204 with the local timestamp 221. The delay processor 122 calculates the A/V delay 124 based on difference. The A/V delay 124 includes the absolute delay 222 and the relative delay 224. In exemplary aspects, the absolute delay 222 refers to the time difference between each extracted timestamp and the local timestamp 221. For example, the difference from the audio timestamp 210 and the local timestamp 221 may be four seconds, while the difference between the video timestamp 206 and the local timestamp 221 may be one second. Thus the relative delay 224 is calculated as the delay between the differences of the audio signal and the video signal (i.e., by comparing timestamp 206 with timestamp 210), as compared to the local timestamp 221, or three seconds in this example. The absolute delay 222 would be four seconds for the audio and one second for the video signal.

In exemplary aspects, the A/V delay 124 may be used to synchronize the audio and video wherein the delay 124 is provided to further audio and video processing equipment. For example, the determined A/V delay 124 can be configured to adjust the timing of one of the audio and video data to synchronize the two signals before subsequent playout. In other aspects the A/V delay 124 is used to determine whether the delay is as expected, or otherwise and further action must take place to correct the delay. Furthermore, the delay processor 122 is configured to analyze the delay 124 and alert an operator to a problem in the transmission path that needed repair. In other aspects, the delay processor 122 is configured to generate an alarm or a log message if the test were done automatically on an idle link.

Figure 3:
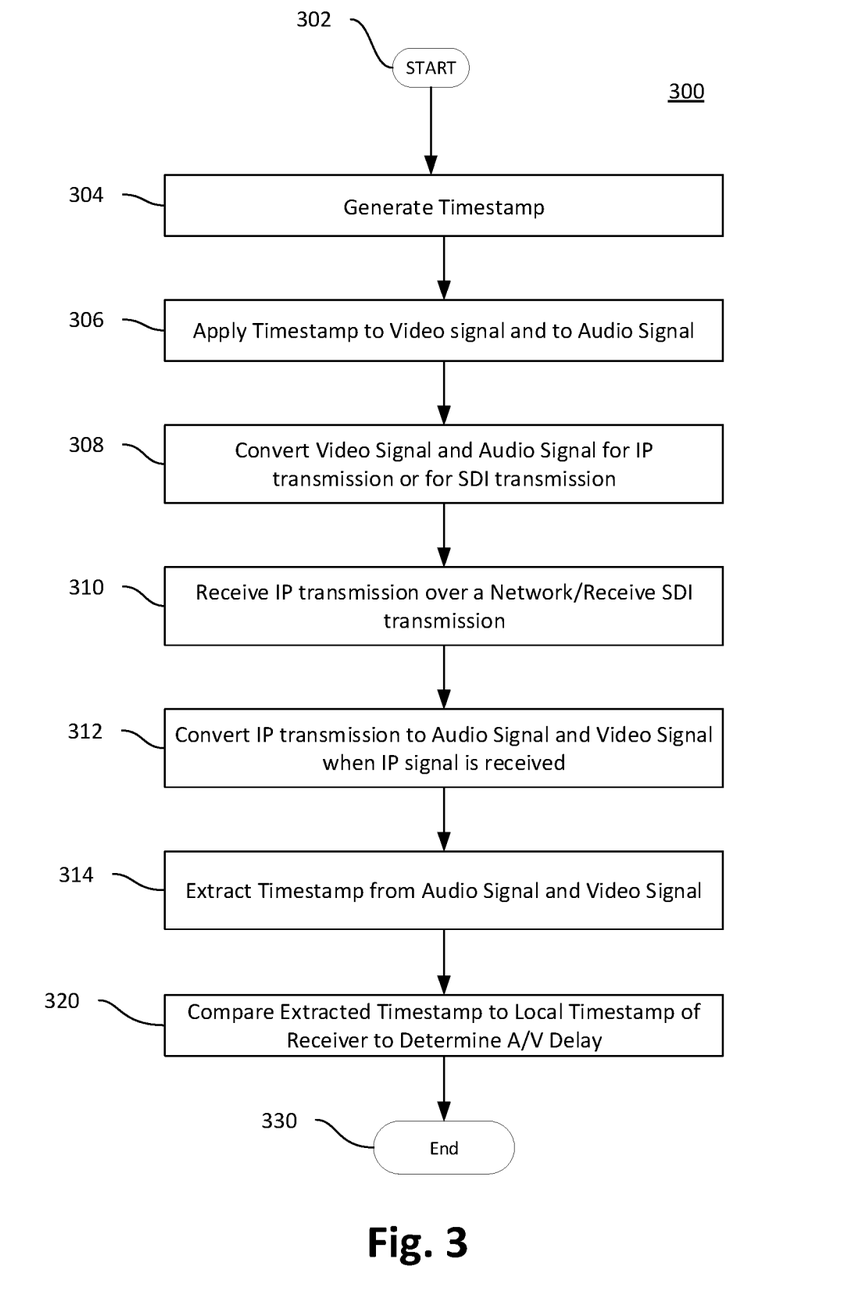
FIG. 3 is a flow diagram of a method of measuring delay in an A/V signal in accordance with an exemplary aspect of the present disclosure.

FIG. 3 is a flow diagram of a method 300 for measuring delay, in accordance with exemplary aspects of the present disclosure. It should be appreciated that the exemplary method 300 can be implemented using the components described above with respect to FIGS. 1 and 2 in an exemplary aspect.

As shown, the method 300 begins at step 302, for example, when data content is captured (e.g., by a camera at a live event) or otherwise obtained from a media server, for example. The method then proceeds to step 304 where a local clock synchronized to a first time server generates a first timestamp, wherein the first time server references (e.g., is synchronized with) a GNSS (e.g., GPS or the like) signal to accurately generate the timestamp.

At step 306, a transmitter applies the first timestamp to a video signal and to an audio signal. In some aspects, distinct timestamps are applied to the video signal and to the audio signal. In further aspects, the frequency of applying the timestamps differ between the video signal and the audio signal. In exemplary aspects, the transmitter 110 may comprise a video camera, a video server or other video transmission components, though the present disclosure is not limited thereto.

At step 308, an IP conversion processor converts the audio and video signal to an IP signal for transmission over a network. In some aspects, the audio and video signal is an SDI signal produced for transmission over an IP network, while in other aspects the SDI signal may be packetized or converted into a different format, depending on need. In some aspects, the AV signal remains strictly in the SDI domain or may be transmitted outside of an IP network or the like, where delay may be introduced or altered.

At step 310, a digital conversion processor receives the IP signal from the transmitter 110 and converts the IP signal into an audio and video signal. In some aspects, the digital conversion processor may not be needed if the signal from the transmitter 110 is received as an SDI signal or the like. In some aspects, the transmitted audio and video signal is an SDI signal including timestamps in the video signal and timestamps in one or more audio channels. In some aspects, at step 312, if the signal is an IP signal, a digital conversion processor is configured to convert the IP signal to an SDI signal, for example.

The receiver 120 has a local clock synchronized to a second time server for generating timestamps, with the second time server being local to the receiver 120. In exemplary aspects, the second time server also references the same GNSS (e.g., GPS) signal as the first time server. In exemplary aspects, the receiver 120 may be a frame synchronizer, a video router, a video switcher, a standards converter or a multi-viewer, though the present disclosure is not limited thereto. The second time server sends synchronization packets to the receiver 120 or the delay processor 122 periodically (e.g., approximately once a second, ten times a second or the like).

At step 314, a delay processor extracts the audio and video timestamps from the SDI signal. The delay processor (e.g., a delay determiner) compares the first set of timestamps to the local timestamps to measure absolute and relative delay between the audio signal and the video signal using the local timestamp at step 320. The method ends at step 330 where, for example, the calculated relative delay may be used for synchronizing two or more signals as described above and before distribution (e.g., broadcast) and/or before playout on a content consuming device (e.g., a television or computing device, for example). For example, a synchronized may be generated based on the received audio and video signals and then transmitted (e.g., by a router or switcher) to one or a plurality of content consuming devices for playout thereon.

In general, it should be appreciated that the methods, devices, processing, and logic described above may be implemented in many different ways and in many different combinations of hardware and software. For example, all or parts of the implementations may be circuitry that includes an instruction processor, such as a Central Processing Unit (CPU) as shown in the computer system in FIG. 5, microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

Figure 4:
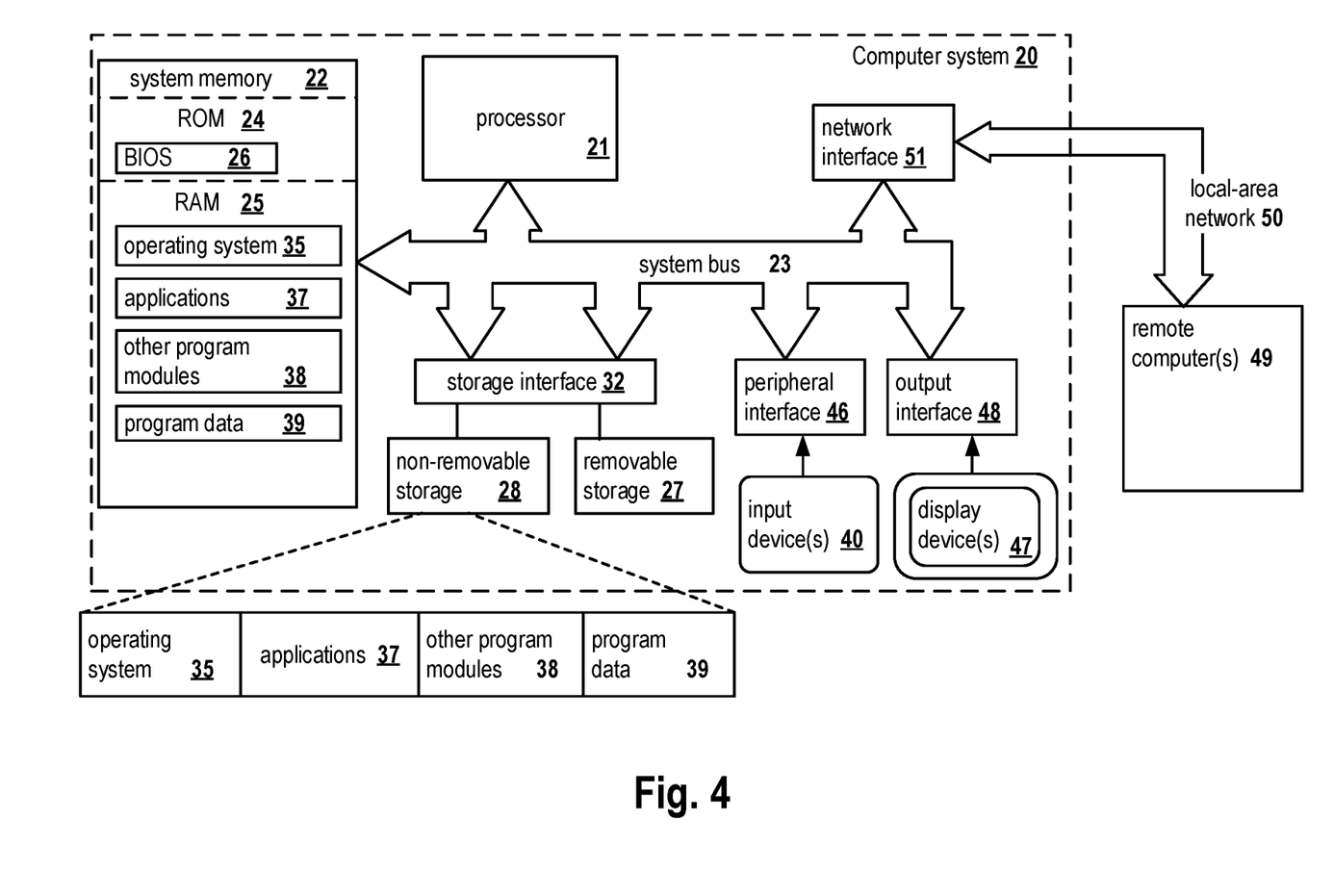
FIG. 4 is a block diagram illustrating a computer system on which aspects of the present systems and methods may be implemented in accordance with an exemplary aspect.

In one exemplary aspect, FIG. 4 is a block diagram illustrating a computer system 20 on which aspects of systems and methods of measuring A/V delay are implemented. It should be noted that the computer system 20 can correspond to the system 100 or any of the components therein. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A system for measuring delay between audio and video signals, the system comprising:
    a first time server configured to generate at least one remote timestamp, wherein the first time server references a global navigation satellite system ("GNSS") signal;
    a transmission device configured to embed a video timestamp to a video signal based on the generated at least one remote timestamp and to embed an audio timestamp to an audio signal based on the generated at least one remote timestamp;
    a receiver configured to receive the audio and video signals with the respective embedded video and audio timestamps;
    a second time server local to the receiver, and configured to synchronize a clock of the receiver to periodically generate a local timestamp, wherein the second time server is configured to synchronize the clock of the receiver based on the GNSS signal;
    a delay processor configured to extract the embedded video timestamp from the video signal and the embedded audio timestamp from the audio signal to determine an absolute delay and a relative delay between the audio and video signals by comparing the local timestamp with each of the extracted video timestamp and the extracted audio timestamp;
    wherein the absolute delay measures a time difference between each of the extracted video and audio timestamps to the local timestamp;
    wherein the relative delay measures a time difference between the extracted video timestamp and the extracted audio timestamp;
    wherein the delay processor is further configured to generate a synchronization signal based on the measured absolute and relative delays; and
    wherein the synchronization signal is configured to synchronize the audio signal with the video signal to generate a media playout signal that comprises the audio and video signals and is configured for playout on a content consuming device.

2. The system of claim 1, wherein the receiver is at least one of a video router, a video switcher, a standards converter and a multi-viewer.

3. The system of claim 1, wherein the delay processor is further configured to transmit a signal to the transmission device to terminate embedding of at least one of the video timestamp in the video signal and the audio timestamp in the audio signal when a delay of at least one of the audio and video signals is above a predetermined time threshold.

4. The system of claim 1, wherein the transmission device is further configured to:
    embed the video timestamp into an active picture of the video signal that indicates a time of an alignment point immediately preceding a start of the active picture; and
    embed the audio timestamp to an audio channel of the audio signal that indicates a reference time within a data pattern of the audio timestamp that is unlinked to the video signal.

5. The system of claim 1, wherein the video timestamp is equivalent to the audio timestamp.

6. The system of claim 1, wherein the transmission device comprises a conversion processor configured to convert the video signal with the embedded video timestamp and the audio signal with the embedded audio timestamp to respective IP packetized data signals to be transmitted to the receiver.

7. The system of claim 1, wherein the first time server is locked directly to the GNSS signal to generate the at least one remote timestamp and the second time server is locked directly to the GNSS signal to synchronize the clock of the receiver.

8. A system for measuring delay between audio and video signals, the system comprising:
    a transmission device configured to:
        embed a video timestamp to a video signal based on at least one remote timestamp generated by a first time server; and
        embed an audio timestamp to an audio signal based on the at least one remote timestamp generated by the first time server;
    a receiver configured to receive the audio and video signal with the respective embedded video and audio timestamps;
    a delay processor configured to extract the embedded video timestamp from the video signal and the embedded audio timestamp from the audio signal to determine an absolute delay and a relative delay of respective time differences between the audio and video signals by comparing each of the extracted video timestamp and the extracted audio timestamp with a local timestamp generated by a second time server that is local to the receiver, with the second time server synchronizing the local timestamp based on a global navigation satellite system ("GNSS") signal;
    wherein the delay processor is further configured to generate a synchronization signal based on the measured absolute and relative delays; and
    wherein the synchronization signal is configured to synchronize the audio signal with the video signal to generate a media playout signal that comprises the audio and video signals and is configured for playout on a content consuming device.

9. The system of claim 8,
wherein the first time server references the GNSS signal;
wherein the second time server is local to the receiver and is configured to synchronize a clock of the receiver to periodically generate the local timestamp; and
wherein the second time server is configured to synchronize the clock of the receiver based on the GNSS signal.

10. The system of claim 8,
wherein the absolute delay measures the time difference between each of the extracted video and audio timestamps and the local timestamp; and
wherein the relative delay measures the time difference between the extracted video timestamp and the extracted audio timestamp.

11. The system of claim 8, wherein the receiver is at least one of a video router, a video switcher, a standards converter and a multi-viewer.

12. The system of claim 8, wherein the delay processor is further configured to transmit a signal to the transmission device to terminate embedding of at least one of the video timestamp in the video signal and the audio timestamp in the audio signal when a delay of at least one of the audio and video signals is above a predetermined time threshold.

13. The system of claim 8, wherein the transmission device is further configured to:
embed the video timestamp into an active picture of the video signal that indicates a time of an alignment point immediately preceding a start of the active picture; and
embed the audio timestamp to an audio channel of the audio signal that indicates a reference time within a data pattern of the audio timestamp that is unlinked to the video signal.

14. The system of claim 8, wherein the video timestamp is equivalent to the audio timestamp.

15. The system of claim 8, wherein the transmission device comprises a conversion processor configured to convert the video signal with the embedded video timestamp and the audio signal with the embedded audio timestamp to respective IP packetized data signals to be transmitted to the receiver.

16. The system of claim 9, wherein the first time server is locked directly to the GNSS signal to generate the at least one remote timestamp and the second time server is locked directly to the GNSS signal to synchronize the clock of the receiver.

17. A system for measuring delay between audio and video signals, the system comprising:
means for embedding a video timestamp to a video signal based on at least one remote timestamp generated by a first time server;
means for embedding an audio timestamp to an audio signal based on the at least one remote timestamp generated by the first time server;
means for extracting the embedded video timestamp from the video signal and the embedded audio timestamp from the audio signal to determine an absolute delay and a relative delay of respective time differences between the audio and video signals by comparing each of the extracted video timestamp and the extracted audio timestamp with a local timestamp generated by a second time server local, with the local timestamp being synchronized based on a global navigation satellite system ("GNSS") signal;
means for generating a synchronization signal based on the measured absolute and relative delays; and
means for synchronizing the audio signal with the video signal to generate a media playout signal that comprises the audio and video signals and is configured for playout on a content consuming device.

18. The system of claim 17,
wherein the absolute delay measures the time difference between each of the extracted video and audio timestamps and the local timestamp; and
wherein the relative delay measures the time difference between the extracted video timestamp and the extracted audio timestamp.

19. The system of claim 17, further comprising means for transmitting a signal to terminate embedding of at least one of the video timestamp in the video signal and the audio timestamp in the audio signal when a delay of at least one of the audio and video signals is above a predetermined time threshold.

20. The system of claim 17, further comprising:
means for embedding the video timestamp into an active picture of the video signal that indicates a time of an alignment point immediately preceding a start of the active picture; and
means for embedding the audio timestamp to an audio channel of the audio signal that indicates a reference time within a data pattern of the audio timestamp that is unlinked to the video signal.

21. The system of claim 17, wherein the video timestamp is equivalent to the audio timestamp.

22. The system of claim 17, further comprising means for converting the video signal with the embedded video timestamp and the audio signal with the embedded audio timestamp to respective IP packetized data signals.

* * * * *